United States Patent [19]

Kuyama et al.

[11] Patent Number: 5,728,761
[45] Date of Patent: Mar. 17, 1998

[54] POLYLACTIC ACID-BASED RESIN COMPOSITION AND USE THEREFOR

[75] Inventors: Hiroki Kuyama, Kyoto; Masaaki Oota, Mukou; Akara Hashimoto, Uji; Kenji Takeda, Kyoto, all of Japan

[73] Assignee: Shimadzu Corporation, Kyoto, Japan

[21] Appl. No.: 723,307

[22] Filed: Sep. 30, 1996

[30] Foreign Application Priority Data

Oct. 3, 1995 [JP] Japan ................... 7-256520

[51] Int. Cl.⁶ ........................... C08K 5/10
[52] U.S. Cl. ................. 524/306; 524/310; 524/315; 524/317; 524/320; 528/354; 528/361
[58] Field of Search ................ 524/306, 310, 524/315, 317, 320; 528/354, 361

[56] References Cited

U.S. PATENT DOCUMENTS 3,636,956 1/1972 Schneider ............... 128/335.5
5,180,765 1/1993 Sinclair ................. 524/306

*Primary Examiner*—Edward J. Cain
*Attorney, Agent, or Firm*—Birch, Stewart, Kolasch & Birch, LLP

[57] ABSTRACT

The polylactic acid-based resin composition includes (a) (i) 100 parts by weight of a poly-L-lactic acid; or (ii) 100 parts by weight of a poly-DL-lactic acid comprising L-lactic acid and D-lactic acid as its constituting units; and (b) 5 to 120 parts by weight of at least one of low-molecular lactic acid derivatives. The molded product is produced by the steps of 1) melt-kneading (a) one of the above components (i) or (ii) and the component (b); and 2) subjecting the melt-kneaded product obtained in step 1) to an injection molding, to give a desired molded product.

6 Claims, No Drawings

POLYLACTIC ACID-BASED RESIN COMPOSITION AND USE THEREFOR

BACKGROUND OF THE INVENTION

1. Field of the Invention

The present invention relates to a polylactic acid-based resin composition, and more particularly to a polylactic acid-based resin composition containing low-molecular lactic acid derivatives as plasticizers and capable of producing formed products with flexibility and toughness.

2. Discussion of the Related Art

With the industrial developments, the amount of the plastics utilized has been markedly increasing, and the waste treatments of these spent plastics have been becoming social problems today. In other words, various plastics have been conventionally used, including polyethylenes, polypropylenes, polystyrenes, polyethylene terephthalates, and vinyl chloride; however, when these plastics were subjected to incineration, the incineration furnace is liable to be damaged and the land is too limited for burying the waste product. Therefore, these waste treatments have been causing serious problems. Also, when the spent plastics are discarded in natural environments, they remain unchanged without being degraded owing to their invulnerableness to microorganisms, thereby impairing the beauty of the scenery. Moreover, they are liable to contaminate living environments of marine organisms.

In order to solve these problems, the research and developments on the biodegradable polymer materials have been widely conducted. A polylactic acid is one example of a polymer which is thermoplastic and biodegradable. This lactic acid polymer undergoes decomposition to harmless carbon dioxide and water under natural environmental conditions.

Presently, the polylactic acids may be produced by two different methods, namely the lactide ring-opening method and the direct polymerization method. In the lactide ring-opening method, a cyclic dimer (lactide) is subjected to ring-opening polymerization. In the direct polymerization method, lactic acid monomers are directly subjected to dehydration condensation to give a desired product.

Various methods for plasticizing the polylactic acids obtainable by the method described above by adding lactide, lactic acid oligomers, or widely used plasticizers thereto have been disclosed. However, in the case where the lactide, the lactic acid oligomers, or the widely used plasticizers are used as plasticizers, the following problems arise: The transparency of the molded product is lowered, and a bleed-out problem is incurred. Also, the efficiency in plasticity becomes poor, and the molecular weight of the matrix is lowered. Further, the widely used plasticizers have unsatisfactory compatibility and efficiency in plasticity.

SUMMARY OF THE INVENTION

In view of solving the problems in the conventional techniques, an object of the present invention is to provide a polylactic acid-based resin composition containing a plasticizer having excellent compatibility with the polylactic acid-based resin and high efficiency in plasticity and being free from such problems as lowering the transparency of the resulting molded product and bleeding out problems, thereby making it possible to produce its molded product with excellent flexibility and toughness.

As a result of intense research in view of the above problems, the present inventors have found that low-molecular weight lactic acid derivatives serve as excellent plasticizers. The present invention has been completed based upon this findings.

In one aspect, the present invention is concerned with a polylactic acid-based resin composition comprising:

(a) (i) 100 parts by weight of a poly-L-lactic acid; or (ii) 100 parts by weight of a poly-DL-lactic acid comprising L-lactic acid and D-lactic acid as its constituting units; and (b) 5 to 120 parts by weight of at least one of low-molecular lactic acid derivatives.

In another aspect, the present invention is concerned with a molded product produced by the steps of:

1) melt-kneading (a) one of the following components (i) or (ii):
   (i) 100 parts by weight of a poly-L-lactic acid; or
   (ii) 100 parts by weight of a poly-DL-lactic acid comprising L-lactic acid and D-lactic acid as its constituting units; and
   (b) 5 to 120 parts by weight of at least one of low-molecular lactic acid derivatives; and 2) subjecting the melt-kneaded product obtained in step 1) to an injection molding, to give a desired molded product.

DETAILED DESCRIPTION OF THE INVENTION

The polylactic acid-based resin composition of the present invention will be explained in detail below.

The lactic acid polymers usable in the present invention may be a poly-L-lactic acid or a poly-DL-lactic acid including D-lactic acid as well as L-lactic acid as its constituting units. These lactic acid polymers have a weight-average molecular weight of generally from 50,000 to 500,000. Here, the proportion of the D-lactic acid constituting unit in the above poly-DL-lactic acids is at most 40 mol %. When the proportion of the D-lactic acid-constituting unit exceeds 40 mol %, the weight-average molecular weight of the obtained poly-DL-lactic acid becomes drastically low (for instance, 10,000 or less). The preferred lactic acid polymers in the present invention are poly-L-lactic acids, or poly-DL-lactic acids including D-lactic acid constituting unit up to an amount of 20 mol %.

The lactic acid polymers may be synthesized by conventionally known methods. In other words, they may be synthesized by a direct dehydration condensation of lactic acid, or ring-opening polymerization of a cyclic dimer (lactide) of lactic acid in the presence of a catalyst.

The catalysts used in the ring-open polymerization reaction are not particularly limited, and examples thereof include a metal selected from the group consisting of elements of Group IA in the periodic table, elements of Group IVA in the periodic table, elements of Group IVB in the periodic table, and elements of Group VA in the periodic table; or metal compounds thereof.

Examples of the metals or compounds of elements of Group IA in the periodic table include hydroxides of alkali metals, such as sodium hydroxide, potassium hydroxide, and lithium hydroxide; alkali metal salts of weak acids, such as sodium lactate, sodium acetate, sodium carbonate, sodium octylate, sodium stearate, potassium lactate, potassium acetate, potassium carbonate, and potassium octylate; and alkoxides of alkali metals, such as sodium methoxide, potassium methoxide, sodium ethoxide, and potassium ethoxide.

Examples of the metals or compounds of elements of Group IVA in the periodic table include tin compounds, such as tin lactate, tin tartrate, tin dicaprylate, tin dilaurate, tin dipalmitate, tin distearate, tin dioleate, tin α-naphthoate, tin β-naphthoate, and tin octylate; and tin powder.

Examples of the metals or compounds of elements of Group IIB in the periodic table include zinc powder, zinc halides, zinc oxide, and organozinc compounds.

Examples of the metals or compounds of elements of Group IVB in the periodic table include titanium compounds, such as tetrapropyl titanate, and zirconium compounds, such as zirconium isopropoxide.

Examples of the metals or compounds of elements of Group VA in the periodic table include antimony compounds, such as antimony trioxide.

All the above catalysts are conventionally used in polymerization of lactic acids. Among them, catalysts comprising tin or tin compounds are preferably used from the aspect of catalytic activity. These catalysts may be Generally used in an amount of about 0.001 to 5% by weight of the lactide.

The polymerization reaction is usually carried out at a temperature range of from 100° C. to 200° C. an the presence of the catalyst mentioned above, and the choice of temperature depends upon the kinds of the catalysts used.

In the present invention, the lactide content in the lactic acid polymer is desirably 1% by weight or less. When the lactide content exceeds 1% by weight, the properties of the resulting thermoplastic resin are susceptible to be affected.

In the present invention, low-molecular weight lactic acid derivatives are used as plasticizers. Examples of the low-molecular weight lactic acid derivatives include the following:

(i) A compound having the following general formula (I):

wherein $R^1$ stands for an alkyl group, an acyl group, an aryl group, or a silyl group; and $R^2$ stands for an alkyl group or an aryl group; and (ii) A compound having the following general formula (II):

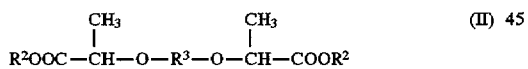

wherein $R^2$ stands for an alkyl group or an aryl group; and $R^3$ stands for a divalent connecting group.

The alkyl groups represented by $R^1$ in the general formula (I) may be substituted or unsubstituted alkyl groups having a total number of 10 or less carbon atoms. Specifically, examples of the substituted or unsubstituted alkyl groups include methyl, ethyl, propyl, isopropyl, butyl, isobutyl, pentyl, hexyl, heptyl, octyl, nonyl, decyl, methoxymethyl, methylthiomethyl, benzyloxymethyl, p-methoxybenzyloxymethyl, (4-methoxyphenoxy)methyl, t-butoxymethyl, dimethylsilyloxymethyl, 2-methoxyethoxymethyl, 2,2,2-trichloroethoxymethoxymethyl, tetrahydrothiofuranyl, and allyl groups. Among the above substituted or unsubstituted alkyl groups, from the aspects of giving smooth introduction of the substituents, stability, and compatibility with matrix, a preference is given to ethyl, propyl, isopropyl, butyl, methoxymethyl, methylthiomethyl, benzyloxymethyl, p-methoxybenzyloxymethyl, (4-methoxyphenoxy)methyl, and dimethylsilyloxymethyl groups.

The aryl groups represented by $R^1$ may be, for instance, substituted or unsubstituted phenyl groups. Here, examples of substituents include p-methoxy group, p-methyl group, p-ethyl group, p-ethoxy group, and p-chloro group.

The acyl groups represented by $R^1$ may be acyl groups having a total number of 15 or less carbon atoms. Here, examples of the acyl groups include acetyl group, methoxyacetyl group, phenoxyacetyl group, levulinoyl group, substituted or unsubstituted benzoyl groups, 9-fluorenylmethyloxycarbonyl group, 2-(trimethylsilyl)ethyloxycarbonyl group, 2-(phenylsulfonyl)ethyloxycarbonyl group, isobutyloxycarbonyl group, and allyl oxycarbonyl group. Among the above acyl groups, from the aspects of availability of the starting materials, giving their smooth introduction, and their stability, a preference is given to the substituted or unsubstituted benzoyl groups.

Examples of the silyl groups represented by $R^1$ include t-butyldimethylsilyl (TBDMS) group, t-butyldiphenylsilyl (TBDPS) group, triisopropylsilyl (TIPS) group, dimethylthexylsilyl (TDS) group, and triphenylsilyl (TPS) group. Among the above silyl groups, from the aspects of availability of the starting materials, giving their smooth introduction, their stability, and compatibility with the matrix, a preference is given t-butyldimethylsilyl and t-butyldiphenylsilyl groups.

The alkyl groups represented by $R^2$ in the general formula (I) and the general formula (II) may be substituted or unsubstituted alkyl groups having a total number of 15 or less carbon atoms. Specifically, examples thereof include methyl, ethyl, propyl, butyl, hexyl, octyl, decyl, methylthiomethyl, 2-(trimethylsilyl)ethoxymethyl, benzyloxymethyl, phenacyl, p-bromophenacyl, N-phthalimidomethyl, 2,2,2-trichloroethyl, allyl, benzyl, and substituted benzyl groups. Among the above substituted or unsubstituted alkyl groups, from the aspects of availability of the starting materials, giving their smooth introduction, and their stability, a preference is given to phenacyl, p-bromophenacyl, methyl, ethyl, butyl, benzyl, and substituted benzyl groups.

The aryl groups represented by $R^2$ may be substituted or unsubstituted phenyl groups. Examples of the substituents may be the same ones for the aryl groups represented by $R^1$ listed above.

$R^3$ in the general formula (II) is a divalent connecting group which is bindable to an oxygen atom. Examples of such divalent connecting groups include alkylenes, such as ethylene, propylene, butylene, pentylene, hexylene, heptylene, octylene, nonylene, decylene; arylenes, such as substituted or unsubstituted phenylenes; and substituted or unsubstituted phthaloyl groups whose both ends have carbonyl groups, including $-CO(CH_2)_2CO-$, $-CO(CH_2)_4CO-$, $-CO(CH_2)_6CO-$, $-CO(CH_2)_8CO-$, and $-CO(CH_2)_{10}CO-$, without being limited to these examples.

Preferred examples of plasticizers in the present invention may be the following:

(i) Those having the general formula (I) wherein:
  (a) $R^1$ stands for a benzoyl group and $R^2$ stands for a methyl group;
  (b) $R^1$ stands for a p-methoxybenzoyl group and $R^2$ stands for a methyl group;
  (c) $R^1$ stands for a p-ethoxybenzoyl group and $R^2$ stands for a methyl group;
  (d) $R^1$ stands for a t-butyldimethylsilyl group and $R^2$ stands for a p-bromophenacyl group; or
  (e) $R^1$ stands for a t-butyldiphenylsilyl group and $R^2$ stands for a phenacyl group.

(ii) Those having the general formula (II) wherein:
 (a) $R^2$ stands for a methyl group and $R^3$ stands for a sebacoyl group;
 (b) $R^2$ stands for an ethyl group and $R^3$ stands for a sebacoyl group;
 (c) $R^2$ stands for a methyl group and $R^3$ stands for a succinoyl group; and
 (d) $R^2$ stands for a butyl group and $R^3$ stands for a sebacoyl group.

In the present invention, these low-molecular weight lactic acid derivatives may be used as plasticizers alone or in combination. The amount of the low-molecular weight lactic acid derivatives in the polylactic acid-based resin composition is from 5 to 120 parts by weight, based on 100 parts by weight of the lactic acid polymer. When the amount of the low-molecular weight lactic acid derivatives is less than 5 parts by weight, sufficient flexibility cannot be given to the resin composition. On the other hand, when the amount exceeds 120 parts by weight, bleed-out may take place depending upon the kinds of the low-molecular weight lactic acid derivatives added. A preferred amount of the low-molecular weight lactic acid derivatives is from 20 to 50 parts by weight, based on 100 parts by weight of the lactic acid polymer.

The low-molecular weight lactic acid derivatives having the general formula (I) can be synthesized by esterifying the carboxyl group of the lactic acid, and subsequently subjecting the hydroxyl group to alkylation, arylation, acylation, or "silylation."

The low-molecular weight lactic acid derivatives having the general formula (II) can be synthesized by esterifying the carboxyl group of the lactic acid, and subsequently connecting the hydroxyl groups of two different molecules by alkylation, arylation, or acylation.

In the resin composition of the present invention, additives including antioxidants, heat stabilizers, light stabilizers, colorants, charging preventives, lubricants, flame retardants, foaming agents, fillers, antibacterial agents, and fungicides may be optionally added thereto.

The plasticizers may be added by a method usually employed in the working of the resin. Specifically, the method comprises the step of adding a plasticizer to a molten resin, melt-kneading the resulting mixture, and then subjecting the obtained resin mixture to injection molding.

Also, the polylactic acid-based resin composition of the present invention may be produced as formed products, such as films, plates, rods, bottles, containers, and sheets by a conventional method. The resulting formed products are free from the problems of lowering of transparency or causing bleed-out and have excellent flexibility and toughness.

The low-molecular weight lactic acid derivatives contained as plasticizers in the polylactic acid-based resin composition of the present invention, particularly those lactic acid derivatives having the above general formula (I) or general formula (II), give sufficient flexibility to the resulting resin composition. Moreover, when the plasticizers are added in an amount sufficient to give such flexibility, the transparency of the polylactic acid polymers is not impaired.

As described above, since the polylactic acid-based resin composition of the present invention contains the low-molecular weight lactic acid derivatives having excellent compatibility with the polylactic acid-based resin, the resulting molded product has excellent transparency and free from bleed-out problems as well as having good flexibility. Therefore, the polylactic acid-based resin composition is highly useful in films, books, package materials, particularly useful as biodegradable resins in applications for wrappings, medical use, and agricultural use.

EXAMPLES

The present invention will be described in further detail by means of the following Production Examples, Examples, and Comparative Examples, without intending to limit the scope of the present invention thereto.

Production Example of Lactic Acid Derivative (a)

A racemic mixture of methyl lactate [1.0 g (9.6 mmol)] was allowed to react with benzoyl chloride [1.74 ml (12.4 mmol)] at room temperature for 2 hours in the presence of pyridine (1.0 ml) in $CH_2Cl_2$ (4.0 ml). The resulting reaction mixture was diluted with ethyl acetate, followed by sequential rinsing with water, a saturated aqueous solution of sodium hydrogen carbonate, and a saturated aqueous solution of NaCl. The organic layer was dried over anhydrous sodium sulfate, and then the resulting mixture was concentrated under a reduced pressure. The resulting crude product was then purified through silica gel column chromatography ("WAKO-GEL C-300," 150 g; ethyl acetate:hexane=1:10), to give Compound (a) (1.9 g, yield: 98%) of the following formula:

The following analytical results were obtained for Compound (a).

Rf=0.59 (ethyl acetate:hexane=1:4)

MS (CI, isobutane) 209 $[M+1]^+$ $^1$H-NMR (270 MHz, $CDCl_3$)δ(ppm): 7,415–7,703(5H, m, aromatic protons), 5,339 (1H, q, 7.0 Hz), 3.766 (3H, s, —$COOCH_3$), 1,631 (3H, d, 7.0 Hz)

Production Example of Lactic Acid Derivative (b)

A racemic mixture of lactic acid [9.73 g (108 mmol)] was dissolved with dried acetone (1600 ml). To the solution, potassium hydrogen carbonate [10.8 g (108 mmol)] and p-bromophenacyl bromide [30.0 g (108 mmol)] were added. The resulting mixture was Stirred under nitrogen at room temperature for 24 hours. The obtained reaction mixture was concentrated under reduced pressure to give crude oil. The obtained crude oil was then resuspended in ethyl acetate, followed by rinsing with water and a saturated aqueous solution of NaCl. The organic layer was dried over anhydrous sodium sulfate, and then the resulting mixture was concentrated under reduced pressure, to give a crude product. The resulting crude product was subjected to re-crystallization from ethyl acetate-hexane, to give a compound (25.2 g; yield 81%) in which its carboxyl hydrogen was substituted by p-bromophenacyl group.

Next, the above compound [970 mg (3.38 mmol)] was dissolved with dried DMF (1.3 ml). To the solution, t-butyldimethylsilyl chloride (TBDMSCl) [612 mg (4.06 mmol)] and imidazole [508 mg (7.46 mmol)] were added at room temperature. The obtained mixture was stirred at room temperature under nitrogen for one hour. The resulting mixture was suspended in hexane, followed by rinsing with water and a saturated aqueous solution of NaCl. The organic layer was dried over anhydrous sodium sulfate, and then the resulting mixture was concentrated under reduced pressure. The resulting crude product was then purified through silica gel column chromatography ("WAKO-GEL C-300," 75 g; ethyl acetate:hexane=1:9), to give Compound (b) (1.32 g, yield: 97%) of the following formula:

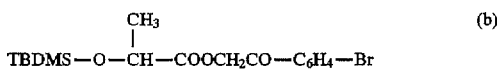
(b)

The following analytical results were obtained for Compound (b).

Rf=0.52 (ethyl acetate:hexane=3:17)
mp:39° to 41° C. (ethyl acetate-hexane)
MS (CI, isobutane) 403 $[M(^{79}Br)+1]^+$
$^1$H-NMR (270 MHz, CDCl$_3$)δ(ppm): 7.606–7.793 (4H, m, aromatic protons), 5.360 (1H, d, 16.2 Hz), 5.286 (1H, d, 16.2 Hz), 4.518 (1H, q, 7.0 Hz), 1.515 (3H, d, 7.0 Hz), 0.907 (9H, S, TBDMS), 0.128 (3H, s, TBDMS), 0.120 (3H, s, TBDMS)

Production Example of Lactic Acid Derivative (c)

A racemic mixture of methyl lactate [3.21 g (30.9 mmol)] was allowed to react with acid dichloride of sebacic acid [3.36 g (14.0 mmol)] at room temperature for 2 hours in the presence of pyridine (3 ml) in CH$_2$Cl$_2$ (20 ml). The resulting reaction mixture was diluted with ethyl acetate, followed by sequential rinsing with water, a saturated aqueous solution of sodium hydrogen carbonate, and a saturated aqueous solution of NaCl. The organic layer was dried over anhydrous sodium sulfate, and then the resulting mixture was concentrated under reduced pressure. The resulting crude product was then purified through silica gel column chromatography ("WAKO-GEL C-300," 200 G; hexane:ethyl acetate=15:1), to give Compound (c) (3.10 g, yield: 60%) of the following formula:

(c)

The following analytical results were obtained for Compound (c).

Rf=0.34 (hexane:ethyl acetate=4:1)
MS (CI, isobutane) 375 $[M+1]^+$

Measurement of Elongation of Films

In following Examples and Comparative Examples, the elongation of the films were evaluated as follows. Specifically, film samples with the dimensions of 20 cm×5 cm were cut out of films obtained for each of Examples and Comparative Examples below produced by injection sheet molding. The elongation was determined by a tensile testing machine.

Examples 1a to 1d

To 100 parts by weight of a poly-L-lactic acid (weight-average molecular weight: 180,000), Compound (a) produced above was added and mixed in an amount given in Table 1 by melt kneading. Here, to 100 parts by weight of the poly-L-lactic acid, Compound (a) was added in an amount of 10 parts by weight (in Example 1a); 30 parts by weight (in Example 1b); 50 parts by weight (in Example 1c); and 100 parts by weight (in Example 1d). The glass transition temperature Tg value of each of the above compositions was determined by DSC.

Next, each of the above compositions was formed into a sheet by injection sheet molding, and each of the obtained sheets was stretched to form a film with a thickness of 200 µm. The elongation of the resulting films was measured.

Comparative Example 1

Similar procedures to those in Examples 1a to 1d were carried out except that Compound (a) was not added. The Tg value of the resulting composition was determined. Also, a film with a thickness of 200 µm was formed, and the elongation of the film was measured.

The results of Examples 1a to 1d and Comparative Example 1 are shown in Table 1.

TABLE 1

| | Compara. Example 1 | Example 1a | Example 1b | Example 1c | Example 1d |
|---|---|---|---|---|---|
| Addition Amount | 0 parts by wt. | 10 parts by wt. | 30 parts by wt. | 50 parts by wt. | 100 parts by wt. |
| Transition Temperature Tg (°C.) | 58 | 38 | 17 | −11 | −25 |
| Elongation (%) | 2 | 4 | 63 | 148 | 172 |

As shown in Table 1, the compositions of Examples 1a to 1d had lower glass transition temperatures than that of the composition of Comparative Example 1 and good flexibility. Particularly in the cases of Examples 1b to 1d where the addition amounts of the plasticizer (Compound (a)) was equal to or higher than 30 parts by weight, the compositions had glass transition temperatures lower than the room temperature, and thus showing sufficient flexibility. Therefore, the films formed from the compositions of Examples 1a to 1d had high elongation and good transparency.

Examples 2a to 2d

Similar procedures to those in Examples 1a to 1d were carried out except that Compound (b) produced above in place of Compound (a) in an amount given in Table 2 was added and mixed. Here, to 100 parts by weight of the poly-L-lactic acid, Compound (b) was added in an amount of 10 parts by weight (in Example 2a); 30 parts by weight (in Example 2b); 50 parts by weight (in Example 2c); and 100 parts by weight (in Example 2d). The Tg value of each of the above compositions was determined in the same manner as in Example 1. Thereafter, each of the above compositions was formed into a sheet by injection sheet molding, and each of the obtained sheets was stretched to form a film with a thickness of 200 µm. The elongation of the resulting films was measured.

Comparative Example 2

Similar procedures to those in Examples 2a to 2d were carried out except that Compound (b) was not added. The Tg value of the resulting composition was determined. Also, a film with a thickness of 200 µm was formed, and the elongation of the film was measured.

The results of Examples 2a to 2d and Comparative Example 2 are shown in Table 2.

TABLE 2

| | Compara. Example 2 | Example 2a | Example 2b | Example 2c | Example 2d |
|---|---|---|---|---|---|
| Addition Amount | 0 parts by wt. | 10 parts by wt. | 30 parts by wt. | 50 parts by wt. | 100 parts by wt. |

TABLE 2-continued

|  | Compara. Example 2 | Example 2a | Example 2b | Example 2c | Example 2d |
| --- | --- | --- | --- | --- | --- |
| Transition Temperature Tg (°C.) | 58 | 46 | 28 | 8.6 | 4.3 |
| Elongation (%) | 2 | 3 | 8 | 90 | 117 |

As shown in Table 2, the compositions of Examples 2a to 2d had lower glass transition temperatures than that of the composition of Comparative Example 2 and good flexibility. Particularly in the cases of Examples 2b to 2d where the addition amounts of the plasticizer (Compound (b)) was equal to or higher than 30 parts by weight, the compositions had glass transition temperatures lower than the room temperature and thus showing sufficient flexibility. Therefore, the films formed from the compositions of Examples 2a to 2d had high elongation and good transparency.

Examples 3a to 3d

Similar procedures to those in Examples 1a to 1d were carried out except that Compound (c) produced above in place of Compound (a) in an amount given in Table 3 was added and mixed. Here, to 100 parts by weight of the poly-L-lactic acid, Compound (c) was added in an amount of 10 parts by weight (in Example 3a); 30 parts by weight (in Example 3b); 50 parts by weight (in Example 3c); and 100 parts by weight (in Example 3d). The Tg value of each of the above compositions was determined in the same manner as in Example 1. Thereafter, each of the above compositions was formed into a sheet by injection sheet molding, and each of the obtained sheets was stretched to form a film with a thickness of 200 µm. The elongation of the resulting films was measured.

Comparative Example 3

Similar procedures to those in Examples 3a to 3d were carried out except that Compound (c) was not added. The Tg value of the resulting composition was determined. Also, a film with a thickness of 200 µm was formed, and the elongation of the film was measured.

The results of Examples 3a to 3d and Comparative Example 3 are shown in Table 3.

TABLE 3

|  | Compara. Example 3 | Example 3a | Example 3b | Example 3c | Example 3d |
| --- | --- | --- | --- | --- | --- |
| Addition Amount | 0 parts by wt. | 10 parts by wt. | 30 parts by wt. | 50 parts by wt. | 100 parts by wt. |
| Transition Temperature Tg (°C.) | 58 | 36 | 19 | −14 | −22 |
| Elongation (%) | 2 | 3 | 42 | 155 | 180 |

As shown in Table 3, the compositions of Examples 3a to 3d had lower glass transition temperatures than that of the composition of Comparative Example 3 and good flexibility. Particularly in the cases of Examples 3b to 3d where the addition amounts of the plasticizer (Compound (c)) was equal to or higher than 30 parts by weight, the compositions had glass transition temperatures lower than the room temperature and thus showing sufficient flexibility. Therefore, the films formed from the compositions of Examples 3a to 3d had high elongation and good transparency.

Examples 4a to 4d

To 100 parts by weight of a poly-DL-lactic acid (content of D-lactic acid constituting unit: 20 mol %; weight-average molecular weight: 120,000), Compound (a) produced above was added and mixed in an amount given in Table 4. Here, to 100 parts by weight of the poly-DL-lactic acid, Compound (a) was added in an amount of 10 parts by weight (in Example 4a); 30 parts by weight (in Example 4b); 50 parts by weight (in Example 4c); and 100 parts by weight (in Example 4d). The glass transition temperature Tg value of each of the above compositions was determined by DSC.

Next, each of the above compositions was formed into a sheet by injection sheet molding, and each of the obtained sheets was stretched to form a film with a thickness of 200 µm. The elongation of the resulting films was measured.

Comparative Example 4

Similar procedures to those in Examples 4a to 4d were carried out except that Compound (a) was not added. The Tg value of the resulting composition was determined. Also, a film with a thickness of 200 µm was formed, and the elongation of the film was measured.

The results of Examples 4a to 4d and Comparative Example 4 are shown in Table 4.

TABLE 4

|  | Compara. Example 4 | Example 4a | Example 4b | Example 4c | Example 4d |
| --- | --- | --- | --- | --- | --- |
| Addition Amount | 0 parts by wt. | 10 parts by wt. | 30 parts by wt. | 50 parts by wt. | 100 parts by wt. |
| Transition Temperature Tg (°C.) | 57 | 36 | 18 | −14 | −26 |
| Elongation (%) | 4 | 5 | 79 | 166 | 208 |

As shown in Table 4, the compositions of Examples 4a to 4d had lower glass transition temperatures than that of the composition of Comparative Example 4 and good flexibility. Particularly in the cases of Examples 4b to 4d where the addition amounts of the plasticizer (Compound (a)) was equal to or higher than 30 parts by weight, the compositions had glass transition temperatures lower than the room temperature and thus showing sufficient flexibility. Therefore, the films formed from the compositions of Examples 4a to 4d had high elongation and good transparency.

Examples 5a to 5d

Similar procedures to those in Examples 4a to 4d were carried out except that Compound (b) produced above in place of Compound (a) in an amount given in Table 5 was added and mixed. Here, to 100 parts by weight of the poly-DL-lactic acid, Compound (b) was added in an amount of 10 parts by weight (in Example 5a); 30 parts by weight (in Example 5b); 50 parts by weight (in Example 5c); and 100 parts by weight (in Example 5d). The Tg value of each of the above compositions was determined in the same manner as in Example 4. Thereafter, each of the above compositions was formed into a sheet by injection sheet molding, and each of the obtained sheets was stretched to form a film with a thickness of 200 μm. The elongation of the resulting films was measured.

Comparative Example 5

Similar procedures to those in Examples 5a to 5d were carried out except that Compound (b) was not added. The Tg value of the resulting composition was determined. Also, a film with a thickness of 200 μm was formed, and the elongation of the film was measured.

The results of Examples 5a to 5d and Comparative Example 5 are shown in Table 5.

TABLE 5

|  | Compara. Example 5 | Example 5a | Example 5b | Example 5c | Example 5d |
|---|---|---|---|---|---|
| Addition Amount | 0 parts by wt. | 10 parts by wt. | 30 parts by wt. | 50 parts by wt. | 100 parts by wt. |
| Transition Temperature Tg (°C.) | 57 | 40 | 15 | 2.1 | −14 |
| Elongation (%) | 4 | 10 | 103 | 194 | 251 |

As shown in Table 5, the compositions of Examples 5a to 5d had lower glass transition temperatures than that of the composition Of Comparative Example 5 and good flexibility. Particularly in the cases of Examples 5b to 5d where the addition amounts of the plasticizer (Compound (b)) was equal to or higher than 30 parts by weight, the compositions had glass transition temperatures lower than the room temperature and thus showing sufficient flexibility. Therefore, the films formed from the compositions of Examples 5a to 5d had high elongation and good transparency.

Examples 6a to 6d

Similar procedures to those in Examples 4a to 4d were carried out except that Compound (c) produced above in place of Compound (a) in an amount given in Table 6 was added and mixed. Here, to 100 parts by weight of the poly-DL-lactic acid, Compound (b) was added in an amount of 10 parts by weight (in Example 6a); 30 parts by weight (in Example 6b); 50 parts by weight (in Example 6c); and 100 parts by weight (in Example 6d). The Tg value of each of the above compositions was determined in the same manner as in Example 4. Thereafter, each of the above compositions was formed into a sheet by injection sheet molding, and each of the obtained sheets was stretched to form a film with a thickness of 200 μm. The elongation of the resulting films was measured.

Comparative Example 6

Similar procedures to those in Examples 6a to 6d were carried out except that Compound (c) was not added. The Tg value of the resulting composition was determined. Also, a film with a thickness of 200 μm was formed, and the elongation of the film was measured.

The results of Examples 6a to 6d and Comparative Example 6 are shown in Table 6.

TABLE 6

|  | Compara. Example 6 | Example 6a | Example 6b | Example 6c | Example 6d |
|---|---|---|---|---|---|
| Addition Amount | 0 parts by wt. | 10 parts by wt. | 30 parts by wt. | 50 parts by wt. | 100 parts by wt. |
| Transition Temperature Tg (°C.) | 57 | 38 | 14 | −19 | −31 |
| Elongation (%) | 4 | 7 | 92 | 211 | 278 |

As shown in Table 6, the compositions of Examples 6a to 6d had lower glass transition temperatures than that of the composition of Comparative Example 6 and good flexibility. Particularly in the cases of Examples 6b to 6d where the addition amounts of the plasticizer (Compound (c)) was equal to or higher than 30 parts by weight, the compositions had glass transition temperatures lower than the room temperature and thus showing sufficient flexibility. Therefore, the films formed from the compositions of Examples 6a to 6d had high elongation and good transparency.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polylactic acid-based resin composition comprising:
   (a) (i) 100 parts by weight of a poly-L-lactic acid;
   (ii) 100 parts by weight of a poly-DL-lactic acid comprising L-lactic acid and D-lactic acid as its constituting units; and
   (b) 5 to 120 parts by weight of at least one of a low-molecular weight lactic acid derivative represented by the following general formula (I):

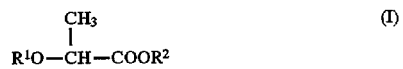

$$R^1O-CH(CH_3)-COOR^2 \quad (I)$$

wherein $R^1$ represents an alkyl group, an acyl group, an aryl group, or a silyl group; and a represents an alkyl group or an aryl group, and a low-molecular weight lactic acid derivative represented by the following general formula (II):

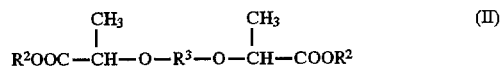

$$R^2OOC-CH(CH_3)-O-R^3-O-CH(CH_3)-COOR^2 \quad (II)$$

wherein $R^2$ represents an alkyl group or an aryl group; and $R^3$ represents a divalent connecting group.

2. The polylactic acid-based resin composition according to claim 1, wherein $R^1$ stands for a substituted or unsubstituted alkyl group having a total number of 10 or less carbon atoms, an acyl group having a total number of 15 or less carbon atoms, a substituted or unsubstituted phenyl group, or a silyl group selected from the group consisting of t-butyldimethylsilyl (TBDMS) group, t-butyldiphenylsilyl (TBDPS) group, triisopropylsilyl (TIPS) group, dimethylthexylsilyl (TDS) group, and triphenylsilyl (TPS) group, and wherein $R^2$ stands for a substituted or unsubstituted alkyl group having a total number of 15 or less carbon atoms, or a substituted or unsubstituted phenyl group.

3. The polylactic acid-based resin composition according to claim 1, wherein $R^2$ stands for a substituted or unsubstituted alkyl group having a total number of 15 or less carbon atoms, or a substituted or unsubstituted phenyl group, and wherein $R^3$ stands for a divalent connecting group.

4. The polylactic acid-based resin composition according to claim 1, wherein the D-lactic acid content in said poly DL-lactic acid is 40 mol % or less.

5. A molded product produced by the steps of:

1) melt-kneading (a) one of the following components (i) or (ii):

(i) 100 parts by weight of a poly-L-lactic acid; or (ii) 100 parts by weight of a poly-DL-lactic acid comprising L-lactic acid and D-lactic acid as its constituting units; and (b) 5 to 120 parts by weight of at least one of a low-molecular weight lactic acid derivative represented by the following general formula (I):

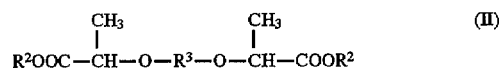
(I)

wherein $R^1$ represents an alkyl group, an acyl group, an aryl group, or a silyl group; and $R^2$ represents an alkyl group or an aryl group, and a low-molecular weight lactic acid derivative represented by the following general formula (II):

(II)

wherein $R^2$ represents an alkyl group or an aryl group; and $R^3$ represents an alkyl group or an aryl group; and $R^3$ represents a divalent connecting group; and 2) subjecting the melt-kneaded product obtained in step 1) to an injection molding, to give a desired molded product.

6. The molded product according to claim 5, wherein the molded product is selected from films, plates, rods, bottles, containers, and sheets.

* * * * *